US00RE37183E

(19) United States
(12) Reissued Patent
Kawamura et al.

(10) Patent Number: US RE37,183 E
(45) Date of Reissued Patent: May 22, 2001

(54) IMAGE DISPLAY PANEL HAVING ANTISTATIC FILM WITH TRANSPARENT AND ELECTROCONDUCTIVE PROPERTIES AND PROCESS FOR PROCESSING SAME

(75) Inventors: Hiromitsu Kawamura, Mobara; Takao Kawamura, Chiba; Katsumi Kobara, Mobara; Yoshishige Endo, Tsuchiura, all of (JP)

(73) Assignee: Hitachi, Ltd., Tokyo (JP)

(21) Appl. No.: 08/986,332

(22) Filed: Dec. 8, 1997

Related U.S. Patent Documents

Reissue of:
(64) Patent No.: 4,945,282
Issued: Jul. 31, 1990
Appl. No.: 07/281,213
Filed: Dec. 8, 1988

(30) Foreign Application Priority Data

| | | |
|---|---|---|
| Dec. 10, 1987 | (JP) | 62-310823 |
| Dec. 10, 1987 | (JP) | 62-310824 |
| Jan. 14, 1988 | (JP) | 63-4715 |
| Feb. 19, 1988 | (JP) | 63-35212 |

(51) Int. Cl.[7] ..... H01J 9/24; H01J 29/88
(52) U.S. Cl. ..... 313/479; 313/478; 358/252; 427/61; 427/106; 427/126.3
(58) Field of Search ..... 313/479, 478

(56) References Cited

U.S. PATENT DOCUMENTS

| | | | | |
|---|---|---|---|---|
| 2,599,739 | * | 6/1952 | Barnes | 313/478 X |
| 4,563,612 | | 1/1986 | Deal et al. | 313/478 |
| 4,723,091 | * | 2/1988 | Kawamura et al. | 313/478 |

FOREIGN PATENT DOCUMENTS

| | | |
|---|---|---|
| 49-24211 | 6/1974 | (JP) . |
| 50-26277 | 3/1975 | (JP) . |
| 55-26277 | 8/1975 | (JP) . |
| 57-85866 | 5/1982 | (JP) . |
| 58-89712 | 5/1983 | (JP) . |
| 59-12550 | 1/1984 | (JP) . |
| 59-96638 | 6/1984 | (JP) . |
| 60-181177 | 9/1985 | (JP) . |
| 61-26679 | 2/1986 | (JP) . |
| 61-51101 | 3/1986 | (JP) . |
| 61-68350 | 4/1986 | (JP) . |
| 61-118932 | 6/1986 | (JP) . |
| 62-143348 | 6/1987 | (JP) . |
| 62-116436 | 7/1987 | (JP) . |
| 62-154540 | 7/1987 | (JP) . |
| 62-176946 | 8/1987 | (JP) . |
| 62-280286 | 12/1987 | (JP) . |
| 62-289801 | 12/1987 | (JP) . |

* cited by examiner

*Primary Examiner*—Ashok Patel
(74) *Attorney, Agent, or Firm*—Antonelli, Terry, Stout & Kraus, LLP

(57) ABSTRACT

There are disclosed an image display panel having an antistatic film comprising a $SiO_2$ coat of transparent and electroconductive properties on the front surface of said panel; the coat containing fine particles of at least one compound selected from electroconductive metal oxides and hygroscopic metal salts; and a process for producing the same.

66 Claims, 5 Drawing Sheets

IMAGE DISPLAY PANEL HAVING ANTISTATIC FILM WITH TRANSPARENT AND ELECTROCONDUCTIVE PROPERTIES AND PROCESS FOR PROCESSING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to image display panels and a process for producing the same, and more particularly, to image display panels, especially screen panels of cathode ray tubes, the front surfaces of which are improved in antistatic properties and if necessary, coated with films best suited for minimizing the reflection of external light, and to a process for producing such panels.

2. Description of Related Art

Transparent base plates made of glass or the like are used for image display panels, as represented by those of cathode ray tubes and liquid crystal display devices. It is desired to inhibit these image display panels from electrification, i.e. being charged with electricity, and from the reflection of external light.

As regards the inhibition of electrification, the wide use of explosion-proof cathode ray tubes in recent years has brought about the uselessness of the front protecting glasses of television receivers or of other display devices and, in consequence, the front parts of cathode ray tubes have become bare. This has caused matters such that a person upon directly touching the front part (panel) of a cathode ray tube, is strongly shocked by high voltage electrostatic charge present on the panel surface. Moreover, the electrified panel surface absorbs atmospheric dirt or dust, which accumulates and fouls the panel surface. This raises the problem of images formed on the panel being hard to see. Taking a cathode ray tube (a color Braun tube or a display Braun tube) as an example, the cause of the electrification will now be explained. As shown in FIG. 4 of the accompanying drawings, a thin uniform aluminum film 4 is vapor-deposited on a phosphor coat 3 laid on the inner wall of the glass panel 7 of the cathode ray tube 1. When a power supply to the cathode ray tube is turned on or off, a high positive-pole voltage is applied to the aluminum film 4 or shut off therefrom. To oppose this high voltage on the inside aluminum film, electric charge develops, that is, electrostatic induction generates electric charge on the outer wall of the panel 7.

In addition, the outer surfaces of the panels (image display panels) of Braun tubes are glassy and hence are liable to strongly reflect external light, making it difficult to read images formed on the panels. Recently, in particular, display devices comprising various cathode ray tubes, besides television receivers, have been used widely as terminals of information machines and apparatus. Therefore the problem of this external-light reflection has become taken up extensively in the field of VDT (visual display terminal). For such reasons, a very strong need for anti-reflection films has been growing.

Thus, demand has become very strong for image display panels provided with the function of inhibiting the reflection of external light, particularly the functions of inhibiting both reflection and electrification.

For inhibiting electrification of the faces of image display panels, there are the method of forming transparent electroconductive coats on the front surfaces of Braun tubes in television receivers and various terminal display devices and grounding these coats; the method (Jap. Pat. Appln. Kokai No. 61-118932) of utilizing airborne moisture, that is the method of leaving small amounts of hydroxy groups in Si—O—Si chains (or networks) formed from the hydrolysis of alkoxysilane applied on the panel face, the hydroscopic nature of which lowers the electric resistance of the glass surfaces of the panels to levels of $10^9$ to $10^{10}$ Ω; and the method (Japanese Patent Application Kokai (Laid-Open) No. 61-118932) of stopping en route the decomposition of a silicon alkoxide such as ethyl silicate applied on the panel faces, thereby leaving some silanol groups (—Si—OH) in the Si—O—Si siloxane structure.

For the formation of transparent electroconductive films, there are known, for example, the method, as shown in Japanese Utility Patent Publication No. 49-24211, of applying an electroconductor solution by spray coating and burning the coats at 450° C. to form transparent conductive films, the method of forming such films by vacuum deposition or sputtering, and the method, as shown in Japanese Patent Application Kokai Nos. 62-154540 and 62-116436, of forming transparent conductive films or extra fine conductive wires in the form of strips or nets.

For inhibiting the panel faces from reflecting external light, there are known, for example, the method of forming so-called telepanels covered with multilayer anti-reflecting films (AR coats), by vapor deposition and adhering these telepanels on the panel faces and the method of spraying the panel faces with an alcoholic solution of $Si(OR_1)_4$ ($R_1$ is alkyl), followed by burning to form coats having minute projections consisting of $SiO_2$ particles.

Further, conventional panels inhibited from the reflection of external light include, for example, glass panels the surfaces of which are etched with silicofluoric acid ($H_2SiF_6$) to form projections or depressions of 50 to 30,000 Å height or depth and 100 to 2,000 Å pitch, thereby imparting a reflection inhibiting function (U.S. Pat. No. 2,490,662) and glass panels the surfaces of which are sprayed with an alcoholic solution of alkoxysilane $Si(OR_1)_4$ and then subjected to burning to form $SiO_2$ coats having fine projections or depressions (Japanese Patent Application Kokai No. 61-118932).

The method of utilizing atmospheric moisture to inhibit the electrification is effective in locations where humidity is relatively high, but exhibits no antistatic effect in locations where humidity is low. In addition, the film fixing temperature cannot be raised over 80° C. because some silanol groups (—Si—OH) must be left in the film constitution (at higher temperatures all the silanol groups convert to form the Si—O—SiO siloxane structure). The coating films formed at such low temperatures exhibit very low strengths and are gradually peeled off by rubbing with a cloth.

Vapor deposition methods are not fitted for mass production, since they generally require large-scale apparatus for vacuum deposition, sputtering, CVD (chemical vapor deposition), or the like and need treatment in vacuo. Moreover, these methods involve significant problems in fabrication cost as well as in increase in throughput. The above-mentioned method of forming transparent conductive films in the form of strips requires more operation steps, requiring high production costs. The formation of extra fine conductor wires in the form of strips has many problems in production cost and in product performance.

According to the method of imparting a reflection inhibiting function by etching, the etching leaves a deposit on the treated surface and the etched surface, damaged chemically, has low abrasion strength, that is, rubbing the etched surface readily removes projections therefrom, reducing the reflection inhibiting effect remarkably.

According to the method of spraying an alcoholic solution of $Si(OR_1)_4$, sprayed liquid particles are deposited more thinly toward the center of the object glass panel face, that is, more thickly toward the periphery. Hence it is difficult to form uniform unevenness throughout the glass surface. This raises the problem of such panels displaying images of low degrees of resolution.

According to the method of spraying an alcoholic solution of $Si(OR_1)_4$ directly against the panel faces of cathode ray tubes, followed by burning to form $SiO_2$ coats have minute projections or depressions, sufficient anti-glare effect can be obtained and the production costs are low, but the burning for the purpose of fortifying the coats decreases the content of hydroxy groups and hence increases the surface resistivities. Therefore the intended antistatic effect cannot be obtained.

According to the method of adhering telepanels provided with AR coats by vapor deposition, excellent reflection inhibiting efficiency can be achieved, but the antistatic effect cannot be obtained since the AR coats consist of an insulator, and in addition the fabrication cost is high.

SUMMARY OF THE INVENTION

An object of the invention is to provide image display panels superior in antistatic function.

Another object of the invention is to provide a process for producing image display panels superior in antistatic function.

A further object of the invention is to provide image display panels superior in both antistatic and reflection inhibiting functions.

A still further object of the invention is to provide a process for producing image display panels superior in both antistatic and reflection inhibiting functions.

The fist aspect of the invention is directed to an image display panel, particularly a cathode ray tube panel, having an antistatic coat formed on the outer surface thereof by applying a suspension of at least one of tin oxide, indium oxide, and antimony oxide in an alcoholic solution of alkoxysilane [$Si(OR_1)_4$, wherein $R_1$ is alkyl] on the front surface of an image display panel and the subjecting the coated panel to heat treatment at relatively low temperatures.

The second aspect of the invention is directed to an image display panel, particularly a cathode ray tube panel, the outer surface of which is coated with a film having both antistatic and reflection inhibiting functions.

The third aspect of the invention is directed to a process for producing image display panels, particularly cathode ray tubes, which comprises applying a suspension of at least one of tin oxide, indium oxide, and antimony oxide in an alcoholic solution of alkoxysilane on the front surface of an image display panel, particularly the panel of a cathode ray tube, and subjecting the coated panel to heat treatment at relatively low temperatures to form an antistatic film.

The fourth aspect of the invention is directed to a process for producing image display panels, particularly cathode ray tubes, the outer surfaces of which are coated with films having both antistatic and reflection inhibiting functions.

Figure 1:
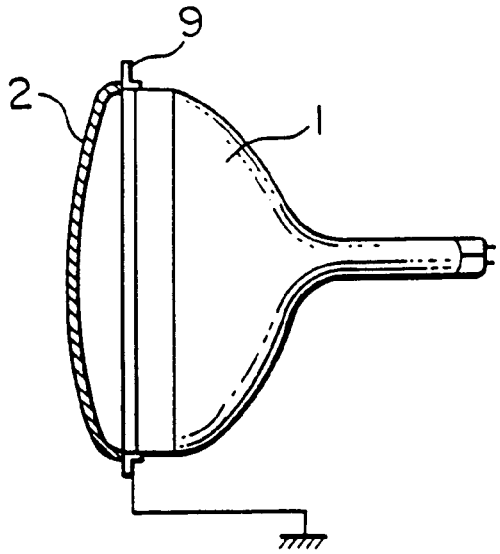
FIG. 1 is a sketch drawing showing an embodiment of the invention.

In these drawings;

1 . . . Cathode ray tube
2 . . . Antistatic coat (or transparent conductive coat)
2' . . . Underlying conductive coat
3 . . . phosphor
4 . . . Aluminum film
6 . . . Reflection inhibiting coat
6a . . . Fine $SiO_2$ particle
6b . . . Thin $SiO_2$ film
7 . . . Panel
8 . . . Anti-glare coat
9 . . . Auxiliary band
14 . . . Curve for Braun tube of present invention
15 . . . Curve for untreated Braun tube
16 . . . Curve for Braun tube treated with ethoxysilane alone
17 . . . Curve for antistatic coat of present invention
18 . . . Curve for conventional coat

DETAILED DESCRIPTION OF PREFERRED EMBODIMENTS

The present invention is directed to an image display panel comprising an antistatic film formed on the front surface of said panel and constructed of a transparent electroconductive coating film formed by $SiO_2$ thin film-like material founded firmly onto said front surface; said film contains particles of at least one compound selected from electroconductive metal oxides and hygroscopic metal salts, and a process for producing such image display panels.

In this case, the $SiO_2$ film may be formed of either one layer or two layers. This coat may have an external-light reflection inhibiting function (hereinafter abbreviated as reflection inhibiting function) in addition to transparent and electroconductive properties. This type of coat may be formed of either a single layer comprising a member having transparent and electroconductive properties with a member having a reflection inhibiting function of a double-layer structure formed of an underlying layer having transparency and electric conductivity and an overlying layer having a reflection inhibiting function.

Therefore the image display panel of the invention is roughly classified into two types of panels. One type thereof, corresponding to the first aspect of the invention, comprises an antistatic layer which consists essentially of a transparent electroconductive coating film. This type of panel is fitted chiefly for cathode ray tubes. The other type of panel, corresponding to the second aspect of the invention, comprises an antistatic layer or a coating film having both an antistatic function and a reflection inhibiting (hereinafter often referred to as non-glare) function. This type of panel includes one having an antistatic layer combining an antistatic function and a reflection inhibiting function. Such panels, in particular, are adaptable for liquid crystal display panels and the like which are not particularly required to have strong antistatic properties. The third aspect is a process for producing image display panels of the first aspect and the fourth aspect is a process for producing panels of the second aspect.

In the first place, image display panels according to the first aspect are described. An essential component of this type panel is an electroconductive metal oxide. Coating this metal oxide layer with $SiO_2$ film yields the intended image display panel.

The first aspect is described below in more detail.

The display panel of the first aspect of the present invention comprises an antistatic thin $SiO_2$ film formed on the front surface of said panel. The film contains fine particles of at least one metal oxide such as $SnO_2$, $In_2O_3$, $SbO_2O_3$ and the like.

The first aspect of the invention can be achieved by suspending fine particles of tin oxide ($SnO_2$), indium oxide ($In_2O_3$), antimony oxide ($Sb_2O_3$), or a mixture of these metal oxides, the particles themselves being transparent and electroconductive, in an alcoholic solution of alkoxysilane [$Si(OR_1)_4$; $R_1$ is alkyl], applying this suspension by spin coating on the front surfaces of the panels of Braun tubes and the like, and then heat-treating the coatings at temperatures of up to 200° C. to form transparent, electroconductive, antistatic coating films.

The panel display of the first aspect can be easily fabricated since it is possible to exhibit sufficient effects by using fine particles having per se transparent and electroconductive properties with heat treatment at a temperature of up to 200° C. without requiring any such high temperature as about 500° C., which is necessary in the liquid coating method to decompose an organic metal compound.

The above particles, having sizes of up to thousands of Å, are practically invisible with human eyes and do not scatter light not appreciably, hence forming a very transparent film. The material connecting these particles together is $Si(OR_1)_4$, which on heating at 200° C. for 30 minutes adheres to glass with sufficiently strong force and acts as a binder to consolidate securely the transparent conductive particles, thus resulting in a film having improved strength.

The thickness of the transparent conductive film, depending upon its component materials, is up to 2000 Å, preferably from 50 to 500 Å, for practical use.

The transparent conductive film optionally contains a hygroscopic metal salt. Such metal salts include salts of inorganic acids such as hydrochloric acid, nitric acid, and sulfuric acid and salts of organic acids such as carboxylic acids. Suitable metals for such metal salts include those of group II represented by magnesium and those of group III represented by aluminum.

To the above suspension may be added a dispersing medium selected from acetylacetone, other ketones, and ethyl Cellosolve; water as a decomposition reactant; and an inorganic acid such as nitric acid as a catalyst for promoting the decomposition, in necessary amounts.

The spin coating can be carried out by using generally about 10–50 ml of the suspension of a 20-inch cathode ray tube. In this case, sufficient amounts of $SnO_2$, $In_2O_3$, and $Sb_2O_3$ applied alone or in mixture are about 0.5–1.0 mg/cm$^2$ of the panel surface area.

The heat treatment can be carried out at about 100° C. for a short time, generally for 5–10 minutes, and then at 150°–200° C., preferably 160°–180° C., for about 25–30 minutes. These conditions are sufficient.

In the first aspect, the heat treatment (burning) of the coating can be accomplished at temperatures of up to 200° C. Accordingly, the suspension can be applied directly on the panels and therefore cathode ray tubes adequate to satisfy quality requirements can be supplied at very low prices.

In the second aspect of the invention, an antistatic function can be imparted effectively by using a transparent electroconductive metal oxide such $SnO_2$, $In_2O_3$, or $Sb_2O_3$ or a hygroscopic metal salt. A reflection inhibiting function can be imparted effectively by using fine $SiO_2$ particles having specific sizes or by forming an antistatic film and further forming an $SiO_2$ film from an alkoxysilane compound.

More specifically, the first embodiment of the second aspect is, for example, an image display panel such as the panel of cathode ray tube which comprises an antistatic $SiO_2$ thin film having a non-glare function formed on the front surface of said panel and fine projections of the surface of said film, the projections being formed by the particles of $SiO_2$. The film contains fine particles of at least one metal oxide selected from $SnO_2$, $In_2O_3$, $Sb_2O_3$ and the like. The display can be provided with an antistatic function and a reflection inhibiting function by applying an alcoholic suspension containing at least one of $SnO_2$, and $Sb_2O_3$ and alkoxysilane on the front surface of the panel of cathode ray tube or the like, converting the resulting coat to a transparent conductive film by preliminary burning, applying further an alcoholic solution of an alkoxysilane compound by spray coating on the transparent conductive film, and burning the whole to form an $SiO_2$ coat having fine projections.

The second embodiment is, for example, an image display panel such as the panel of cathode ray tube, the front surface of the panel being coated with a transparent conductive film which in turn is covered with a non-glare $SiO_2$ film containing fine $SiO_2$ particles of 100–10,000 Å in diameter.

The third embodiment is, for example, an image display panel such as the panel of cathode ray tube, the L front surface of the panel being covered with a $SiO_2$ thin film (or coat) having non-glare function as well containing fine $SiO_2$ particles of 100–10,000 Å in diameter and an additive selected from hygroscopic metal salt particles and conductive metal oxide particles.

In the above first and second embodiments, the thickness of the transparent conductive film, which is used as an underlayer for the non-glare film (or coat), depends upon the materials composing the transparent conductive film. For practical use, this thickness is desirably up to 2000 Å, preferably from 50 to 500 Å.

The transparent conductive film, particularly in the second embodiment, may be a thin $SiO_2$ film into which such a transparent conductive metal oxide and/or a hygroscopic metal salt as mentioned above has been incorporated to impart conductivity. The hygroscopic metal salt contained in the above thin $SiO_2$ film may be a salt with an inorganic acid such as hydrochloric acid, nitric acid or sulfuric acid or a salt with an organic acid such as a carboxylic acid. Preferred metal salts include salts of group II metals represented by magnesium and salts of group III metals represented by aluminum. These metal salts absorb moisture from the atmosphere to lower the electric resistance of the panel surface. The conductive metal oxide, on the other hand, which itself has conductivity, is preferred to the metal salt for the purpose of lowering the electric resistance of the panel surface. While the conductivity imparting metal oxide and/or metal salts, even when its content is too low, exhibits its effect a little, suitable contents thereof are 0.01–1.0 $mg/cm^2$, particularly 0.15–0.3 $mg/cm^2$, of surface area of the thin $SiO_2$ film. The lower limit of the above range is defined from the minimum requirements as properties of conductivity film and the upper limit is from the lower limit of adhesive strength of the $SiO_2$ film to the panel surface.

The underlying conductive film must have such thickness and properties as to have practically no adverse effect on the performance characteristics of the overlying reflection inhibiting film (or coat). The above stated conductive film according to the invention satisfies these requirements.

In the second embodiment the reflection inhibiting film needs to contain fine $SiO_2$ particles of 100–10,000 Å in diameter.

These diameters (average diameters) of fine $SiO_2$ particles are restricted from the relation between the degree of image resolution and the reflection inhibiting effect. The lower limit of diameters is defined in view of the reflection inhibiting effect, that is to say, when the diameter is less than 100 Å, the intended reflection inhibiting effect is difficult to obtain. On the other hand, the upper limit is defined in view of the degree of resolution. When the diameter exceeds 10,000 Å, the degree of resolution lowers remarkably. Accordingly, while the above range has been defined as a practically acceptable range, the diameter is desirably 500–1200 Å, preferably 500–600 Å, particularly preferably about 550 Å.

When the amount of fine $SiO_2$ particles fixed on the panel surface (or on the conductive film) is small, the effect is observed a little. For practical use, the amount is 0.01–1 $mg/cm^2$, preferably 0.1–0.3 $mg/cm^2$, of surface area of the substrate. This range has been defined for reasons similar to those in the case of the $SiO_2$ particle diameter. That is, the lower limit has been defined in view of the reflection inhibiting effect while the upper limit in view of the degree of resolution.

In the third embodiment, the reflection inhibiting film can formed to contain the above stated fine $SiO_2$ particles and an additive composed of the above stated metal oxide and/or metal salt. In this case, the metal oxide used can be selected from generally known conductive metal oxides including those having perovskite structures. The incorporation of at least one of the above stated additives will suffice.

The third aspect of the invention is directed to a process for producing image display panels, particularly cathode ray tubes, which comprises mixing fine particles of at least one compound selected from transparent conductive $SnO_2$, $In_2O_3$, $Sb_2O_3$ and the like with an alcoholic solution of alkoxysilane to form a suspension, applying this suspension on the front surface of an image display panel such as a Braun tube panel, and heating the resulting coat at temperatures of up to 200° C. to form a transparent conductive film having an antistatic function.

The alcohol is desired to have the same number of carbon atoms as does the alkyl of the alkoxysilane used to form thin $SiO_2$ films.

The alkoxysilane is represented by the general formula $Si(OR_1)_4$ wherein $R_1$ is alkyl. Generally, preferred alkyls have 1 to 5 carbon atoms.

For coating panel surfaces or other substrates, spin coating and dip coating methods can be used.

Materials and conditions used in the third aspect will be described later together with those used in the fourth aspect since many of the materials and conditions are common to both aspects.

Similarly to the second aspect, the fourth aspect includes three embodiments, which are described separately in brief.

The first embodiment is a process for producing image display panels such as cathode ray tube, which comprises coating the front surface of an image display panel with an alcoholic solution containing an alkoxysilane and at least one of $SnO_2$, $In_2O_3$, and $Sb_2O_3$, burning the resulting coat preliminarily to convert it into a transparent conductive film, then spray-coating this film with an alcoholic solution of alkoxysilane, and burning the whole to form a conductive coat having fine $SiO_2$ projections at its surface.

The second embodiment is a process for producing image display panels such as cathode ray tubes, which comprises the steps of: forming a transparent conductive film on the front surface of an image display panel; dispersing fine $SiO_2$ particles of 100–10,000 Å in diameter in an alcoholic solution of alkoxysilane $Si(OR_1)_4$, wherein $R_1$ is alkyl, and applying this dispersion on the transparent conductive film formed on the front surface of the panel; and heating the resulting coat to decompose the $Si(OR_1)_4$ contained therein and form a thin $SiO_2$ film, thereby coating and fixing the fine $SiO_2$ particles with the thin $SiO_2$ film.

In the first place, the step of forming the transparent conductive film is described in detail. Since this film is formed on an image display panel such as the panel of a cathode ray tube, it is desirable to form this film under such conditions, particularly temperature conditions (up to about 500° C.), as to give no strain to the glass plate which constructs the panel. The film may be formed according to any method that satisfies the above noted requirement. A typical method to form the transparent conductive film is illustrated below.

When the film is formed of at least one conductive metal oxide selected from $SnO_2$, $In_2O_3$, and $Sb_2O_3$, there are known, for example, the following methods (1) and (2) to form the film directly on the glass panel. (1) A target formed of at least one of the above metal oxides is fixed in a sputtering apparatus with the target itself being opposed to the glass panel, and a metal oxide film is formed by sputtering on the panel surface. (2) Using an organic metal compound as a raw material, a conductive metal oxide film is formed on the glass panel by the generally known CVD process. In this method (2), suitable organic metal compounds for use include alkyl metal compounds represented by $M(R_1)_m$ and alkoxy metal compounds represented by $M(OR_1)_m$, wherein M denotes Sn, In or Sb, m denotes the valency of M, and $R_1$ denotes alkyl ($C_nH_{2n+1}$, n=1 to 5 for practical use). Specific examples of the organic metal compound include $Sn(CH_3)_4$ and $Sn(OC_2H_5)_4$. However, this method is not preferable for the practical use due to high temperature burning.

Therefore, it would be better to form the thin $SiO_2$ film by hydrolyzing an alkoxy silane $Si(OR_1)_4$, wherein $R_1$ is alkyl and n=1 to 5 for practical use. In the present invention, at least one additive, as described in detail in the explanation of the second aspect of the invention, selected from transparent conductive metal oxides and hygroscopic metal salts is added to an alcoholic solution of said $Si(OR_1)_4$ for the purpose of imparting conductivity to the objective film, this mixture in liquid form is applied on the panel surface, and the coating surface is heated to decompose the $Si(OR_1)_4$, thereby forming a thin $SiO_2$ film. The additive is used in an amount desirably from 0.05 to 7%, preferably from 1.0 to 2.0% by weight based on the alcoholic solution.

Of the above-mentioned additives, the transparent conductive metal oxide is insoluble but dispersed in the alcoholic solution while the metal salt is dissolved partly or entirely. For the purpose of forming a thin $SiO_2$ having good conductivity, it is desirable to disperse or dissolve the additive thoroughly in the alcoholic solution. In view of the above, a ketone (e.g. acetylacetone) or ethyl cellosolve is preferably added as a dispersing medium to the alcoholic solution. Moreover, water and an inorganic acid catalyst, e.g. nitric acid, are preferably added to facilitate the hydrolysis of $Si(OR_1)_4$.

The alcohol to solve the $Si(OR_1)_4$ is desired to have the same alkyl group as the $R_1$ or $Si(OR_1)_4$. A most useful alcoholic solution of $Si(OR_1)_4$ is composed of tetraethoxysilane $Si(OC_2H_5)_4$ ($R_1$ is ethyl) as a solute and ethyl alcohol as a solvent.

The above stated alcoholic solution is applied on the panel surface by a coating method such as spin coating, dip coating, spray coating or a combination of these methods.

The heat treatment of the coating surface to decompose the $Si(OR_1)_4$ and thereby form a thin $SiO_2$ film is carried out at temperatures desirably from 50° to 200° C., preferably from 160° to 180° C. Because the heat treatment is carried out at relatively low temperatures, this method of forming a thin conductive $SiO_2$ film is advantageous over the conventional film forming methods (1) and (2) mentioned above. When this method is applied to cathode ray tubes, e.g. Braun tubes, completed bulbs can be treated. Hence, this method is best suited for mass production processes. Needless to say, this method is also applicable to Braun tubes and the like before completion of the bulbs, that is, in the course of the production of the tubes.

In the second place, detailed description is given on the step of forming the non-glare film on the substrative transparent conductive film.

The alcoholic solution of alkoxysilane (alkyl silicate) $Si(OR_1)_4$ is prepared in the following manner. Both $Si(OR_1)_4$, which is the source of the thin $SiO_2$ film, and the solvent alcohol are the same as in the case of the thin $SiO_2$ film formation, which has been described above (formation of underlying transparent conductive film). Therefore, detailed description of $Si(OR_1)_4$ and the alcohol is omitted.

Fine $SiO_2$ particles of 100–10,000 Å in diameter are dispersed in an alcoholic solution of $Si(OR_1)_4$ prepared as described above. The amount of said particles is desirably from 0.1 to 10%, preferably from 1 to 3%, by weight based on the alcoholic solution from the viewpoint of the reflection inhibiting effect and the degree of image resolution. A ketone (e.g. acetylacetone) or ethyl Cellosolve, acting as a dispersing medium, is preferably added to the alcoholic solution for the purpose of securing a sufficient dispersion and moreover, water and inorganic acid catalyst, e.g. nitric acid are preferably added to facilitate the hydrolysis of $Si(OR_1)_4$.

Moreover, while the use of $Si(OR_1)_4$ Where $R_1$ is ethyl in the formation of reflection inhibiting films has been illustrated, alkoxysilanes $Si(OR_1)_4$ having 1 to 5 carbon atoms in $R_1$ are favorable, as sated before, in other words, where $R_1$ is represented by $C_nH_{2n+1}$, n is desired to be from 1 to 5; when n=1, 3, 4, or 5, effects achieved are similar to those achieved when n=2. However, since the viscosity of the alcoholic solution increases slightly with an increase in n, it is recommendable to choose an alcohol fitted as a solvent for the alkoxysilane to use in consideration of the workability. A most useful alcoholic solution of $Si(OR_1)_4$ is composed of tetraethoxysilane ($R_1$=ethyl) as solute and ethyl alcohol as a solvent.

The above stated dispersion of fine $SiO_2$ particles in an alcoholic solution of $Si(OR_1)_4$ is applied on the transparent conductive substrate film by a coating method such as spin coating, dip coating, spray coating, or a combination of these methods, as mentioned above (formation of thin conductive film of $SiO_2$).

When the $Si(OR_1)_4$ is decomposed by heating the coating surface to form a thin $SiO_2$ film (or coat) and cover and fix the dispersed fine $SiO_2$ particles with the film, the heating temperature is desirably from 50° to 200° C., preferably from 160° to 180° C.

The reflection inhibiting film is formed as described above, wherein the heat treatment temperature, similarly to the case of the underlying film stated above, is relatively low. Hence, this method of forming reflection inhibiting films is favorable for the formation such films on the panel surfaces of completed cathode ray tubes.

The underlying transparent conductive film thus formed, adherent intimately to the panel surface, exhibits the effect of reducing the electric resistance of the panel surface. The film composed of a metal oxide having per se conductivity or the thin $SiO_2$ film in which a conductive metal oxide is dispersed shows the reduction of surface resistivity caused by the same principle as in the case of a so-called transparent conductive film. The antistatic function is maintained by this reduction. In case of the thin $SiO_2$ film containing a hygroscopic metal salt, on the other hand, conductivity is imparted due to the absorption and retention of moisture by the metal salt. The metal salt retains its hygroscopicity after being subjected to the heat treatment to hydrolyze the $Si(OR_1)_4$ (this heat treatment improves the film strength), not losing its function but having the action of reducing the resistivity of panel surface. Of the additives to be contained in the thin $SiO_2$ film, the conductive metal oxide is superior to the hygroscopic metal salt in the function of reducing the resistivity of panel surface. In particular, oxides of tin, indium, and antimony are favorable in that the resulting films are superior in transparency and can maintain high degrees of image resolution. Unlike metal oxides, certain metal salts are fixed in melted form in the film. In such a case, the film is superior in transparency and retains a high degree of image resolution.

The reflection inhibiting film, in which fine $SiO_2$ particles are dispersed uniformly and fixed with a thin $SiO_2$ film, has fine uniform projections at the outermost surface, said projections being constructed of fine $SiO_2$ particles covered with the thin $SiO_2$ film. This surface having fine uniform projections scatters external light, thus exhibiting reflecting inhibiting effect.

The third embodiment is a process for producing image display panels, which comprises the steps of; dispersing fine $SiO_2$ particles of 100–10,000 Å in diameter and particles of at least one additive selected from hygroscopic metal salts and conductive metal oxides in an alcoholic solution of alkoxysilane $Si(OR_1)_4$; applying this dispersion on the front surface of an image display panel and heating the coating surface to decompose the $Si(OR_1)_4$, thereby forming a thin $SiO_2$ film to cover and fix the fine $SiO_2$ particles with the thin $SiO_2$ film, thus forming a film having non-glare function as well on the front surface of the panel.

The amounts of materials and the manner of using materials, in this embodiment, are almost the same as in the second embodiment. Therefore the description of the amounts and of the manner are omitted. In this embodiment, however, there is no step of forming such a transparent conductive film as is formed in the second embodiment. After application of the alkyl silicate solution, the heat treatment is conducted to form the thin $SiO_2$ film.

When the $Si(OR_1)_4$ is decomposed by heating the coating surface to form a thin $SiO_2$ film, the heating temperature is desirably from 50° to 200° C., preferably from 160° to 180° C. Since the heat treatment in this embodiment is carried out at such relatively low temperatures, completed bulbs can be treated when this method is applied to cathode ray tubes, e.g. Braun tubes. Hence, this method is best suited for mass production processes. Needless to say, this method is also applicable to Braun tubes and the like before completion of the bulbs, that is, in the course of the production of the tubes.

In the thus formed film having non-glare function as well fine $SiO_2$ particles uniformly dispersed, as stated above, are covered and fixed on the glass plate (substrate) with a thin film of $SiO_2$ formed by the hydrolysis of $Si(OR_1)_4$. These uniformly dispersed fine $SiO_2$ particles permit the retention of reflection inhibiting effect and of the high degree of image resolution. Moreover the thin $SiO_2$ film contains the additive, i.e., a conductive metal oxide and/or a hygroscopic metal salt, which retains its hygroscopicity after being subjected to the heat treatment to hydrolyze the $Si(OR_1)_4$ (this heat treatment improves the film strength), not losing its function but having the action of reducing the resistivity of panel surface. On the other hand, when the conductive metal oxide is used, the reduction of surface resistivity is observed which is caused by the same principle as in the case of a so-called transparent conductive film. The antistatic function is maintained by those reductions of surface resistivity. Of the additives used in the invention, which exhibits antistatic effect, the conductive metal oxide is superior to the hygroscopic metal salt in the function of reducing the surface resistivity of substrate. In particular, oxides of metals such as tin, indium, and antimony are favorable in that the resulting films are superior in transparency and can maintain high degrees of image resolution. Unlike metal oxides, certain metal salts are fixed in melted form in the film. In such a case, the film is superior in transparency and retains a high degree of image resolution.

The following examples illustrate the present invention, the scope of which is not restricted, of course, by these examples.

EXAMPLE 1

Referring to FIG. 1, this example 1 is explained. An antistatic film 2 is formed on the panel surface of a Braun tube 1. A grounded reinforcing band 9 is in contact with the antistatic film 2, maintaining the entire surface of this film at zero potential.

The antistatic film 2 is formed in the following manner: Fine particles of any of metal oxides having transparent and conductive properties themselves, e.g. $SnO_2$, $In_2O_3$, $Sb_2O_3$, and mixtures of them, i.e. $SnO_2$ alone, $In_2O_3$ alone, $SnO_2$+$In_2O_3$, $SnO_2$+$In_2O_3$+$Sb_2O_3$, $SnO_2$+$In_2O_3$+$Sb_2O_3$ are dispersed thoroughly in an alcoholic solution of ethyl silicate $Si(OC_2H_5)_4$ to prepare a suspension. To this suspension may be added a suitable dispersing aid (e.g. acetylacetone) and a decomposition promoting catalyst (e.g. an inorganic acid) in small amounts. For a 20-inch Braun tube, about 10 ml of the suspension is consumed.

Then, this suspension is dropped on the panel of Braun tube 1 rotated at 100 rpm with the panel surface being directed upward. At the time the applied suspension spreads all over the surface, the revolution is increased to 500 rpm, forming a thin uniform coating. This spin coating is completed in a total time of 1 minute.

Thereafter the coating is dried by heating at 105° C. for about 10 minutes, and burned at 160° C. for 30 minutes, thereby forming the antistatic film 2.

Figure 8:
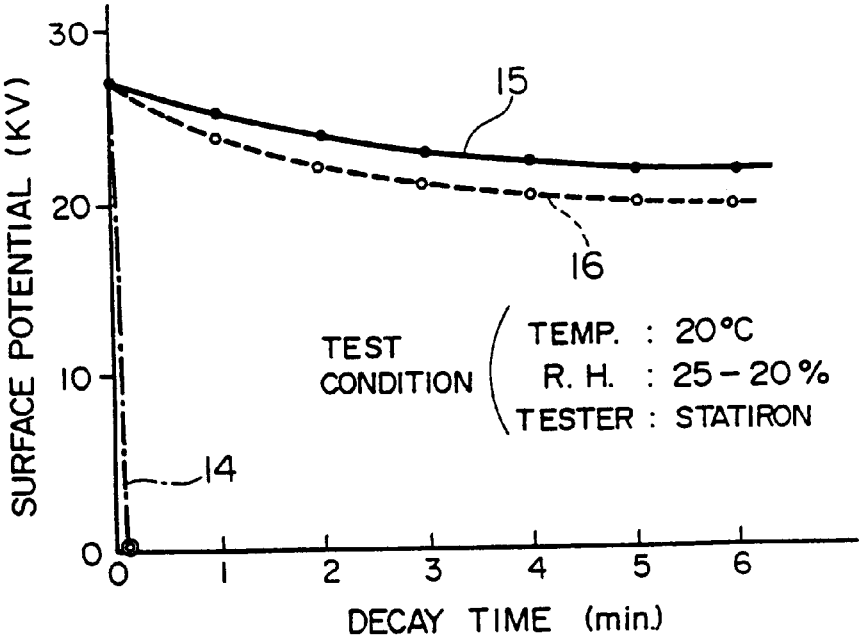
FIG. 8 is a graph showing electric charge decay characteristics, i.e. electric charge decay curves, of Braun tubes obtained in Example 1 of this specification.

FIG. 8 shows electric charge decay characteristic curves for 20-inch color display tubes surface-treated in this example. In this drawing; 14: the panel coated with the above stated antistatic film according to the present invention; 15: the panel untreated; 16: the panel having an antistatic coat formed by applying an alcoholic solution of ethyl silicate alone on the untreated panel surface, followed by burning the coat at 160° C. for 30 minutes to leave some silanol groups. As is evident from FIG. 8, the color display tube provided with the antistatic coat according to the present invention shows a surface potential decay to 9 kV in about 10 seconds, while the other tubes after 5 minutes retain surface potentials of 20 kV and more, being much inferior in electric charger decay characteristic.

In the next place, the durability of antistatic coats (formed in the manner described above according to present invention) was examined by measuring changes in their surface resistivity. Results were as follows: The change in resistivity when each specimen was rubbed 250 times reciprocally with an eraser (No. 50—50 of Lion Jimuki Co., Ltd.) under a load of 1 Kg was not more than one figure. The change in surface resistivity when each specimen was rubbed 1000 times reciprocally with GURASUKURU (tradename) of Johnson Co. was not more than 0.5 figure. The change in surface resistivity when each specimen was immersed in an aqueous NaOH solution of pH 12 at room temperature for 24 hours was also not more than one figure. Further, no change was observed in surface resistivity when each specimen was placed in an oven of 120° C. for 96 hours.

Thus, these panels, having nothing the matter with their antistatic function, exhibit this function fully under any environmental conditions.

In this example, $In_2O_3$ was found to have the characteristic of providing lower resistivity than does $SnO_2$.

According to the present invention, the burning of coats can be carried out below 200° C. and hence completed (but surface-untreated) bulbs can be directly coated and highly durable antistatic films can be formed with ease at low costs. In addition, since, high-voltage electric charge generated on the thus treated panel surfaces of Braun tubes can be removed in a moment, the surfaces are prevented from fouling due to atmospheric dust or dirt and thereby the normal distinction of images can be retained and moreover electric discharge to human bodies close the display panels and similar troubles can be avoided.

EXAMPLE 2

Figure 2:
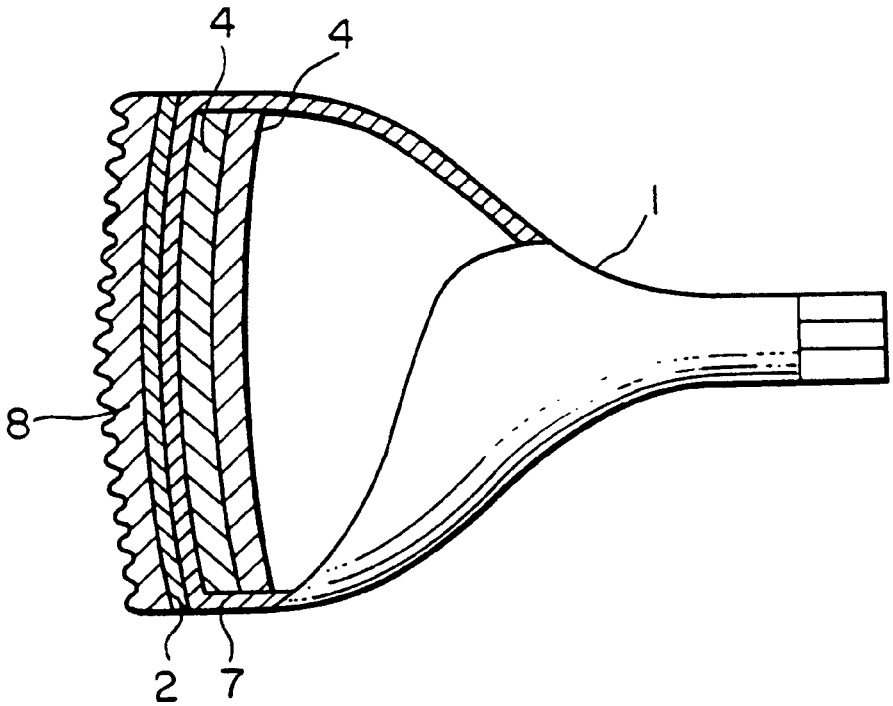
FIG. 2 is a schematic partially sectional view of an embodiment of the invention.

Referring to FIG. 2, another embodiment of the present invention is illustrated in detail.

First, the front surface of the panel 7 of a cathode ray tube 1 is cleaned by using an abrasive such as $CeO_2$ and an alkali detergent such as (trademark, SILIRON HS supplied by Henkel-Hakusui Corp.). Then this surface is coated uniformly with an alcoholic solution containing at least one of $SnO_2$, $In_2O_3$, and $Sb_2O_3$ and $Si(OR_1)_4$, wherein $R_1$ is alkyl, by using, for example, a spinner. The above solution was dropped in an amount of about 10 ml for a 14-type cathode ray tube, the revolution of the spinner was 600 rpm, and the coating period was 1 minute. However, the coating method is not limited to spin coating but may be dip coating or spray coating. The coated cathode ray tube was burned preliminarily at 100°–110° C. for 5 minutes to form a transparent conductive coat 2, which is a substrate film. This substrate cooling to about 50° C. was spray coated at an air pressure of 3.5 kg/cm$^2$ with an alcoholic solution of $Si(OR_1)_4$ so as to give a definite gloss. Then the tube was subjected to main burning at 150°–200° C. for 30 minutes, thereby forming an anti-glare film 8 having fine projections of $SiO_2$ and high strength.

As to reflective properties of the thus formed anti-glare film 3, the 5° regular (specular) reflectance was 1.5%, which is sufficiently low as compared with 4.5% said reflectance of the untreated glass panel. That is, the anti-glare film 8 was found to have a good reflection inhibiting function. Rubbing the surfacer of this film 50 times with an eraser (Lion 50—50) changed the 5° regular reflectance by 0.1% only, proving the sufficient strength of the film and posing no problem relating to the anti-glare function.

Figure 9:
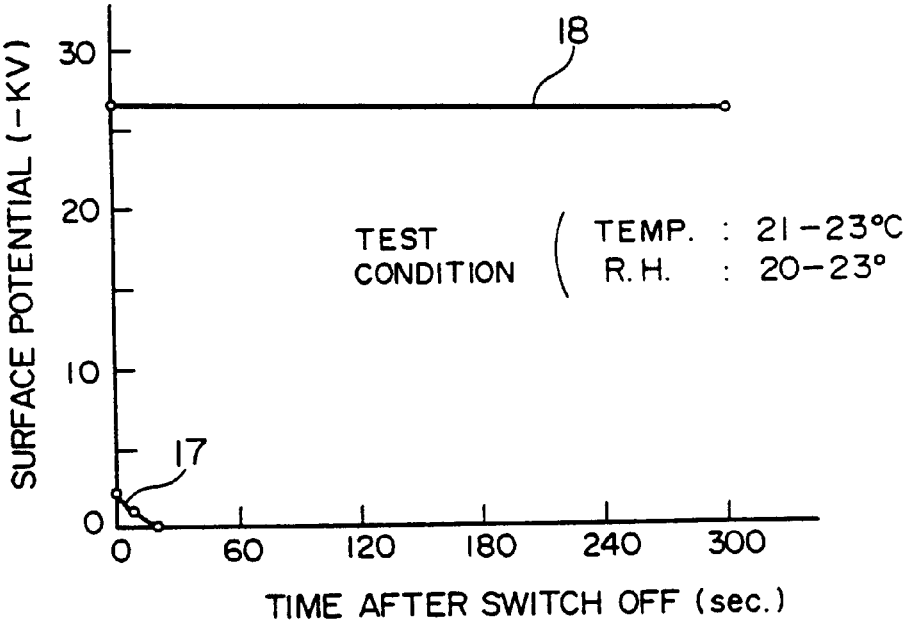
FIG. 9 is a graph to illustrate the antistatic effect of the coating film obtained in Example 2.

The antistatic function of the treated surface is illustrated below. FIG. 9, curve 17 shows the relation between time (second) and surface potential after switch-off of the 20-type TV receiver according to this example (test conditions: temperature 21°–23° C., relative humidity 20–23%). Curve 18 in FIG. 9 shows the electric charge decay characteristic (such relation as stated above) of a conventional tube, the panel surface thereof being untreated. As can be seen from curve 18, little change was observed in surface potential for the conventional tube even after 300 seconds. In contrast, the surface potential for the tube according to the present invention, as shown by curve 17, drops to almost 0 kV in 5 seconds.

As illustrated above, it is possible according to the present invention to produce cathode ray tubes which have on the front surface of each panel a film superior in antistatic function and reflection inhibiting function (anti-glare effect) as well as in mechanical strength and are easy to manufacture in large quantity at low costs.

EXAMPLES 3–6

Transparent conductive substrate films were formed on the front surfaces of the panels (glass panels) of Braun tubes, as shown in Table 1, Examples 3–6.

In Example 3, the conductive film, constructed of $SnO_2$, was formed by CVD under the following conditions:

Apparatus used: Normal-pressure CVD apparatus

Raw material organo-tin compound: $Sn(CH_3)_4$

Dopant: Freon gas

Carrier gas: $N_2$

Substrate temperature (glass panel): 350° C.

In Example 4, the film, constructed of a thin $SiO_2$ film containing fine transparent conductive $SnO_2$ particles, was formed in the following manner:

(1) Composition of alcoholic solution of alkoxysilane $Si(OR_1)_4$:

Ethanol ($C_2H_5OH$): 88 ml

Ethoxysilane ($Si(OC_2H_5)_4$): 6 ml

Fine transparent conductive powder of $SnO_2$: 1.2 g

Water: 6 ml (2) Application of solution on glass panel:

Spinner at 500 rpm (3) Burning of coat: 160° C., 30 minutes

While $In_2O_3$, $Sb_2O_3$, and their mixture were also used as fine transparent conductive powders in place of $SnO_2$, the results were nearly equal. Therefore $SiO_2$, as mentioned above, has been taken as a typical example.

In Example 5, the film was formed by depositing an $In_2O_3$—$SnO_2$ mixture on a glass panel, as mentioned above, by high-frequency sputtering using an $In_2O_3$—$SnO_2$ (5 wt %) compound target.

In Example 6, the film, constructed of a thin $SiO_2$ film containing aluminum nitrate $Al(NO_3)_3.9H_2O$ as a hygroscopic metal salt, was formed in the following manner:

(1) Composition of alcoholic solution of alkoxysilane $Si(OR_1)_4$:

Ethanol ($C_2H_5OH$): 88 ml

Ethoxysilane ($Si(OC_2H_4)_4$): 6 ml

Metal salt, $Al(NO_3)_3.9H_2O$: 1.2 g

Water: 6 ml (2) Application of solution on glass panel:

Spinner at 500 rpm (3) Burning of coat film: 160° C., 30 minutes

While $AlCl_3$, $Ca(NO_3)_2$, $Mg(NO_3)_2$, $ZnCl_2$ and their mixtures were used as hygroscopic metal salts in place of aluminum nitrate, the results were nearly equal. Therefore aluminum nitrate, as mentioned above, has been taken as a typical example.

Subsequently, conductive substrate films formed as stated above were coated with reflection inhibiting films in the following manner:

Ethoxysilane [$Si(OC_2H_5)_4$] is dissolved in ethanol, and water for hydrolysis and nitric acid as a catalyst are added to prepare a solution. To this alcoholic solution are further added 1 wt % of fine $SiO_2$ particles (nearly sphere-shaped) screened to 500–1000 Å in diameter and a suitable amount of acetylacetone as a dispersing medium to disperse the $SiO_2$ particles sufficiently.

The thus prepared solution, the composition of which is shown in Table 1, is dropped on each conductive substrate film and spread uniformly by using a spinner.

Figure 3A:
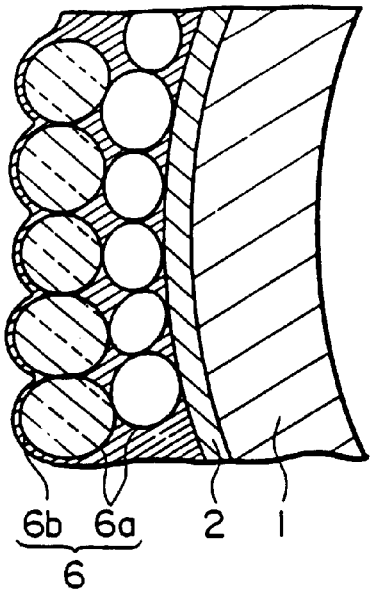
FIGS. 3(a) and 3(b) are a partially sectional view of a cathode ray tube showing schematically an embodiment of the invention and an enlarged sectional view showing the underlying electroconductive coat and the reflection inhibiting coat of the cathode ray tube, respectively.
Figure 3B:
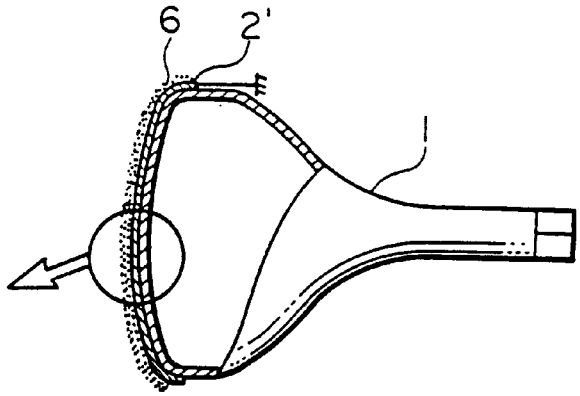
Figure 4:
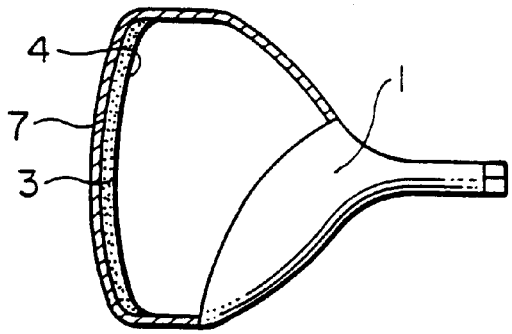
FIG. 4 is a schematic fragmentary sectional view for explaining the electrification of the panel of cathode ray tube.
Figure 6:
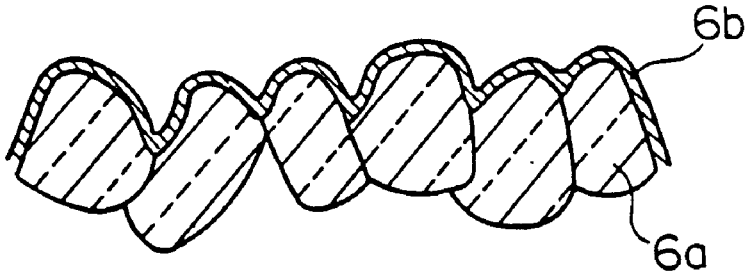
FIG. 6 is an enlarged sectional view of an outermost surface part of a reflection inhibiting coat, the view showing schematically another embodiment of the invention.

Thereafter each coat is burnt in the air at 150° C. for about 30 minutes to decompose the ethoxy-silane. Fine $SiO_2$ particles in the coat are fixed firmly by a thin, uniform, continuous $SiO_2$ film resulting from the decomposition, forming fine projections at the surface. Electron microscopic observation revealed that the thus formed reflection inhibiting film has uniform projections or depressions of 1000 Å±200 Å height or depth and 500 Å pitch at the outermost surface as shown in FIG. 3(b), which is an enlarged view of a cross section shown in FIG. 3(a). In FIG. 3(b), 6 denotes the reflection inhibiting film, 6a denotes fine $SiO_2$ particles, 6b denotes a thin $SiO_2$ film formed by the decomposition of ethoxysilane, and 2 denotes the conductive substrate film.

TABLE 1

| Item | | Example No. 3 | 4 | 5 | 6 | Comparative Example |
|---|---|---|---|---|---|---|
| Conductive substrate film | Main component | $SnO_2$ | $SnO_2$ | $In_2O_3$ + $SnO_2$ | Hygroscopic component in thin $SiO_2$ film | Not formed |
| | Forming method | CVD of organo-tin compound | Fine $SnO_2$ powder + Hydrolysis of alkoxy-silane | Sputtering | Hydrolysis of alkozy-silane | |
| | Film thickness (Å) | 100 | 300 | 100 | 100 | |
| | Surface resistivity (Ω/square) | $10^8$ | $10^8$ | $10^7$ | $10^{10}$ | |
| Composition of suspension for R.I.F.* (wt %) | Solution of $Si(OC_2H_5)_4$ in ethanol | 50 | 50 | 50 | 50 | 50 |
| | Dispersion medium (acetylacetone) | 50 | 50 | 50 | 50 | 50 |
| | Fine $SiO_2$ particles | 1 | 1 | 1 | 1 | 1 |
| Property | Reflectance % (5* regular reflection, 550 nm) | 0.4> | 0.3> | 0.4> | 0.3> | 0.3> |
| | Strength (increase of reflectance by 50 times rubbing with eraser) % | +0.1> | +0.1> | +0.1> | +0.2> | +0.1> |
| | Time for potential decay to 1 kV after switch off (sec.) | 10> | 10> | 15> | 25> | 200> |

Mark *R.I.F. means reflection inhibiting film

A beam of light of wavelength 550 nm was incident at an incident angle of 5° on the reflection inhibiting film formed as described above on said glass panel, and the reflectance was measured. The found reflectance was less than 0.4%. The reflectances measured similarly but with the wavelength varied were less than 1% in the wavelength range of 450 to 650 nm as shown by curve I of FIG. 10. These values are adequate to satisfy reflectance requirements for VDTs (visual display terminals).

Subsequently, the surface of the reflection inhibiting film formed together with the underlying antistatic film on said glass panel, as stated above, was rubbed strongly and uniformly 50 times with an eraser (Lion 50—50). Resulting reflectances, as shown by curve II of FIG. 10, showed shifts of only about 0.1–0.2%, which pose no quality problem.

Figure 10:
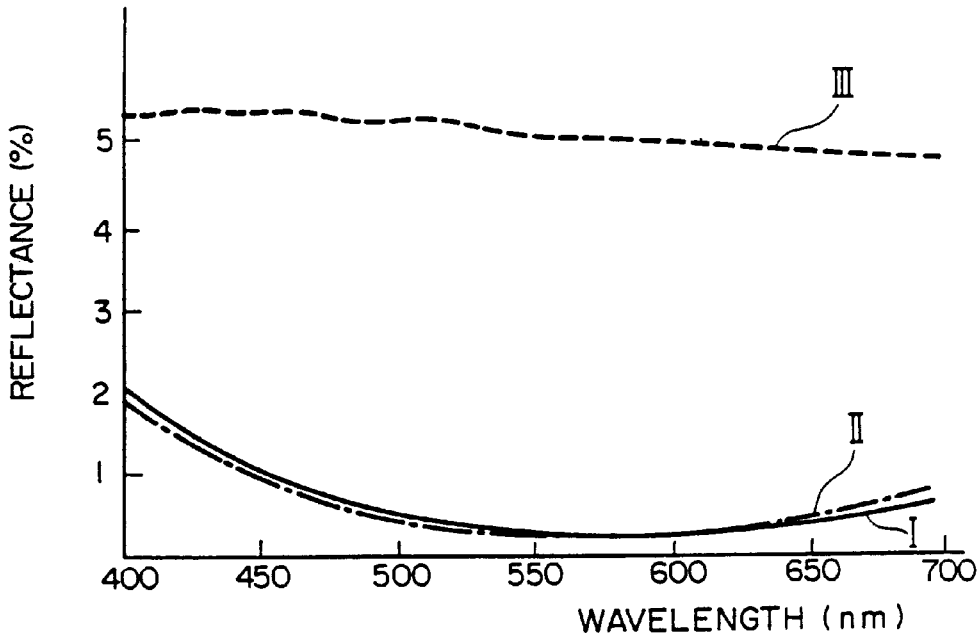
FIG. 10 is a graph showing results of measuring reflectivities of a reflection inhibiting coat which is an embodiment of the invention in comparison with results of measuring those of a conventional coat.

Curve III of FIG. 10 shows, for comparison, plots of reflectance of a similar glass panel but subjected to no reflection inhibiting treatment.

The reason for reducing the reflectance of the glass panel by forming such a reflection inhibiting film as stated above over the panel surface is explained below.

Figure 5:
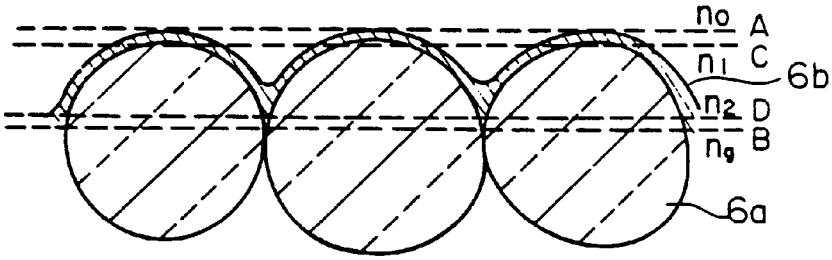
FIG. 5 is an illustration for explaining the principle of inhibiting light reflection.

Referring to FIG. 5, which shows a cross section of the reflection inhibiting film, the reflective index at positions A is that ($n_o$) of air and $n_o$ is about 1. On the other hand, the refractive index at positions B, where fine $SiO_2$ particles are present in a packed state, is nearly equal to the refractive index $n_g$=1.48 of glass ($SiO_2$). The refractive index in the unevenness part between planes A and B varies continuously according to the volume fraction of $SiO_2$. That is, when extremely thin plates formed by slicing said unevenness part in parallel to planes A and B are supposed, the refractive index (mean value) of an arbitrary one of these supposed plates depends on the proportion of the volume occupied by the $SiO_2$ part to the whole volume of this plate. Therefore the refractive index in said unevenness part varies with said volume proportion of $SiO_2$. When the refractive index (mean value) of the extremely thin plate C positioned inside and nearest the plane A is denoted by $n_1$ and the refractive index (mean value) of the extremely thin plate D positioned outside and nearest the plane B is denoted by $n_2$, the condition that the reflectance R at the surface of glass panel on which the above stated reflection inhibiting film is formed becomes the minimum is:

$$R = \frac{(n_1 n_g - n_2 n_o)^2}{(n_1 n_g + n_2 n_o)^2} = 0$$

Hence, when the condition $$n_g = \frac{n_2}{n_1}$$

is satisfied, a non-reflecting function (the ability to prevent the reflection of external light completely) is given.

In this case, the value $n_2/n_1$ depends on the shapes and sizes of projections or depressions. Therefore, projections or depressions having such a shape and size as to satisfy the equation $n_g=n_2/n_1$ approximately can be formed by coating a suspension of fine $SiO_2$ particles in an alcoholic solution of $Si(OR_1)_4$, followed by burning the coat, as described above. Thus it is conceivable that the reflectance as low as 1% or less has been achieved by forming such ideal projections or depressions.

The reason for the retention of high mechanical strength by the reflection inhibiting film according to the present invention is conceivably that $Si(OR_1)_4$ contained in the coat before burning is hydrolyzed as shown by the equation $$Si(OC_2H_5)_4+4H_2O \rightarrow Si(OH)_4+4C_2H_5OH \rightarrow SiO_2+2H_2O$$

to form an $SiO_2$ film, which acts as a strong protective coat.

In addition, screened fine $SiO_2$ particles effect the formation of fine uniform projections and thus the entire surface has a good reflection inhibiting function. Further, the fine uniform size of $SiO_2$ particles results in no surface that is more uneven than needs and lowers the degree of resolution.

Figure 11:
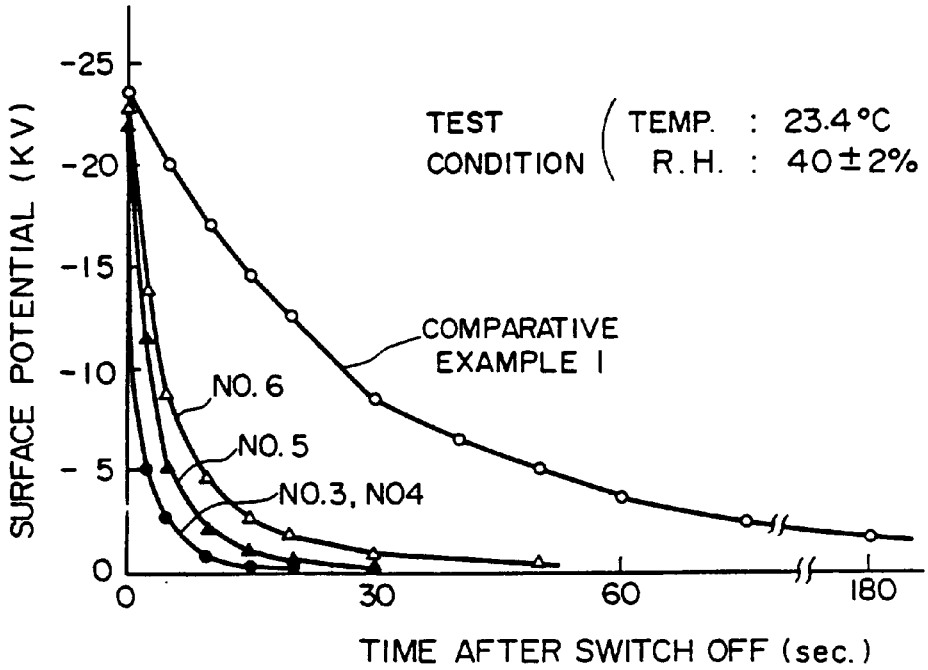
FIG. 11 is a graph showing antistatic effects of an electroconductive coat which is an embodiment of the invention in comparison with the antistatic effect of a conventional coat.

In the next place, the antistatic function shown in the bottom line of Table 1 is explained. FIG. 11 shows the relation between time and surface potential after switch of a TV receiver. The curve number in FIG. 11 corresponds to the example number in Table 1. In the case of Comparative Example, the surface potential, after 200 seconds, still does not decay to 1 kV or below, that is, the coating film has no antistatic function. Such panel surfaces adsorb dust or dirt from the atmosphere, do not release it, and hence become foul. Images which these fouled panels display will be hard to see.

The process for the formation of reflection inhibiting films according to the present invention can be performed merely by adding fine $SiO_2$ particles, commercially available, to an alcoholic solution of existing $Si(OR_1)_4$, and applying the resulting suspension on conductive substrate films formed on completed bulbs, followed by burning the resulting coats, without using any of harmful chemicals such as hydrofluoric acid. Thus the process can be operated with safety and at low costs.

The shape of fine $SiO_2$ particles to use is not limited to spheric but may be irregular as shown in FIG. 6, wherein 6a denotes fine $SiO_2$ particles and 6b denotes a thin $SiO_2$ film. The average particle size is desired to be about 100–10,000 Å. When the particle size is less than about 100 Å, the outer surface of the resulting film will be too smooth to exhibit sufficient reflection inhibiting effect. On the contrary, when the particle size exceeds about 10,000 Å, the light-diffusing effect of the resulting surface becomes too large and the degree of resolution as well as the film strength lower.

The method to apply the suspension of fine $SiO_2$ particles in alcoholic $Si(OR_1)_4$ solution is not limited to spin coating, mentioned in the above examples, but may be any of dip coating, spray coating, and combination of these methods. Suitable temperatures for burning the coat are about 50°–200° C.

While $Sn(CH_3)_4$ was used as a raw material in the formation of the conductive substrate film for CVD purposes in above Example 3, it is possible, of course, to use other alkyltin compounds $Sn(R_1)_4$ or alkoxytin compounds $SnOR_1)_4$ or alternatively, organic compounds of indium or antimony similar to organic compound of tin. Also the metal salt to add is not limited to salts of aluminum, calcium, magnesium, and zinc; any metal salt may be used provided that it is hygroscopic. The addition of a transparent conductive powder of tin oxide, indium oxide, or antimony oxide, as in Example 2, is favorable in particular since a thin $SiO_2$ film having good conductivity can be formed at relatively low temperatures (50°–200° C.) in this case.

As describe above, it is possible according to the present invention to produce cathode ray tubes provided with coats having an antistatic function due to conductive substrate coats and a reflection inhibiting function due to reflection inhibiting coats and are mechanically strong. In addition, this process uses no harmful chemical such as hydrofluoric acid and employs relatively low treatment temperatures and simple and safety unit processes. Thus this process for producing such cathode ray tubes is fitted for mass production and the produced panels are superior in four resistance.

EXAMPLES 7–10

These examples illustrate embodiments where the present invention is applied to the front surfaces of the panels (glass panels) of Braun tubes.

Ethoxysilane $[Si(OC_2H_5)_4]$ is dissolved in ethanol and water for hydrolysis and nitric acid as a catalyst are added to prepare a solution. To this alcoholic solution are added 1 wt % of fine $SiO_2$ particles (nearly spheric) screened to 500–1000 Å in diameter and a suitable amount of acetylacetone as a dispersing medium.

To the above alcoholic solution, each of different compounds shown in Table 2 were added in a predetermined amount prior to the addition of fine $SiO_2$ particles. Table 2 shows a comparative example wherein no material for antistatic purposes was added, besides Examples 7–10.

Each of compounded suspensions shown in Table 2 is dropped on the glass panel, and spread uniformly by a spinner.

Figure 7A:
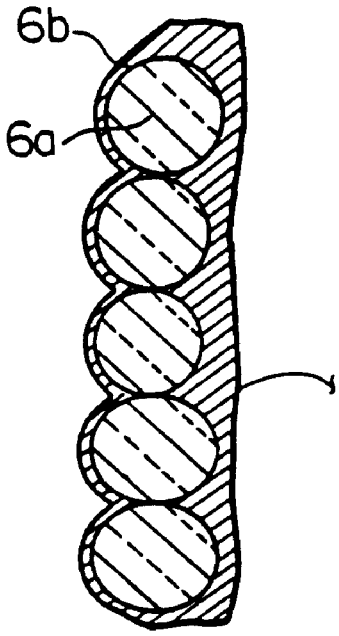
FIGS. 7(a) and 7(b), similarly to FIGS. 3(a) and 3(b), are a fragmentary sectional view of a cathode ray tube and an enlarged sectional view of the reflection inhibiting coat of the cathode ray tube.
Figure 7B:
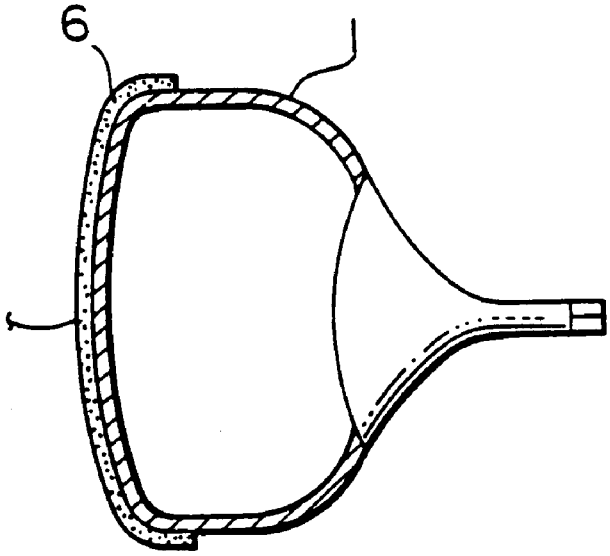

Thereafter the resulting coat is burnt at 150° C. for about 30 minutes to decompose the ethoxy-silane. The fine $SiO_2$ particles in the coat are fixed firmly with a thin uniform continuous film of $SiO_2$ resulting from the decomposition, thus forming fine projections or depressions over the glass panel. Electron microscopic observation of a cross section of the thus formed reflection inhibiting film revealed that uniform projections or depressions of 1,000 Å±200 Å in height or depth and 500 Å pitch were formed at the outer surface of the reflection inhibiting film, as shown in FIG. 7(b), which is an enlarged view of the part shown in FIG. 7(a). In FIG. 7(b), 6 denotes the reflection inhibiting film, 6a denotes fine $SiO_2$ particles, and 6b denotes the thin $SiO_2$ film resulting from the decomposition of tetraethoxysilane and containing an antistatic additive.

TABLE 2

| Item | | | Example No. 7 | 8 | 9 | 10 | Comparative Example |
|---|---|---|---|---|---|---|---|
| Component (wt %) of suspension | Additive | Solution of $Si(Oc_2H_5)_4$ in ethanol | 50 | 50 | 50 | 50 | 50 |
| | | $Al(NO_3)_3 \cdot 9H_2O$ (Nitrate | 0.5 | 0.5 | — | — | — |
| | | $AlCl_3$ (chloride) | — | 0.2 | — | — | — |
| | | $AlO(CH_3COO)_4 \cdot 4H_2O$ (carboxylate) | — | — | 0.7 | — | — |
| | | $SnO_2$ (conductive metal oxide) | — | — | — | 1.0 | — |
| | Dispersing medium, Acetylacetone | | 50 | 50 | 50 | 50 | 50 |
| | Fine $SiO_2$ particle | | 1.0 | 1.0 | 1.0 | 1.0 | 1.0 |
| Property | Reflectance (%), 5* regular reflection, 550 nm | | 0.5> | 0.5> | 0.5> | 0.5> | 0.5> |
| | Surface resistivity (Ω/square) | | $1 \times 10^9$> | $1 \times 10^8$> | $1 \times 10^9$> | $1 \times 10^7$> | $1 \times 10^{12}$ |
| | Strength (increase in reflectance when surface is rubbed 50 time with eraser) | | +0.1> | +0.2> | +0.1> | +0.2> | +0.2> |

Reflectance was measured by casting a beam of light of wavelength 550 nm at an incident angle on this reflection inhibiting film formed on said glass panel. The found reflectance was below 0.5% as shown in Table 2. Further, the reflectances measured similarly but with the wavelength varied were less than 1% in the wavelength range of 450 to 650 nm as shown by curve I of FIG. 10. These values are adequate to satisfy reflectance requirements for VDTs.

Subsequently, the surface of the reflection inhibiting film formed on said glass panel was rubbed strongly and uniformly 50 times with an erase (Lion 5050). Resulting reflectances, as shown by strength in Table 2 and curve II of FIG. 10, showed shifts of only about 0.1–0.2%, which pose no quality problem. For comparison, the same test was made on a similar glass panel surface roughened by a conventional etching process. In this case, the reflectance was 2% increased by one rubbing with the eraser. The rubbing 5 times gave the same reflectance as that of the surface of untreated glass panel, reflectances of which are as shown by curve III of FIG. 10.

The reason for reducing the reflectance of the glass panel by forming such a reflection inhibiting film as stated above can be considered to be the same as explained in Examples 3–6.

The low surface resistivity, as shown in Table 2, has been achieved conceivably because antistatic components from the suspension act effectively and do not largely affect the reflection inhibiting function and the film strength.

Such reflection inhibiting film can be formed directly on completed bulbs merely by adding fine $SiO_2$ particles, commercially available, to an alcoholic solution of existing $Si(OR_1)_4$, applying the resulting suspension, followed by burning the resulting coats, without using any harmful chemical such as hydrofluoric acid. Thus this film forming process can be operated with safety and at low costs.

While the use of $Si(OR_1)_4$ where $R_1$ is ethyl has been illustrated in the above examples, alkoxysilanes $Si(OR_1)_4$ having 1 to 5 carbon atoms in $R_1$ are useful as stated before. However, since the viscosity of the alcoholic solution increases slightly with an increase in n, it is recommendable to choose an alcohol fitted as a solvent for the alkoxysilane to use in consideration of the workability.

Moreover, while salts of aluminum have been illustrated as typical metal salts which are additives to produce antistatic effect, other hygroscopic salts of groups II and III metals of the periodic table achieve equivalent antistatic effect. As to conductive metal oxides also, $SnO_2$ has been illustrated as a representative in the above example, other generally known metal oxides, e.g. $In_2O_3$, $Sb_2O_3$, complex metal oxides have perovskite type structures such as $LaNiO_3$, $La_{1-x}Sr_xCoO_3$ (resistivities of these compounds are all $10^{-4}$ Ωcm at normal temperature) may be used. In these examples, the shape of fine $SiO_2$ particles, suspension coating method, and coat burning temperature and period are the same as in Examples 3–6.

According to the present invention, it is possible to produce image display panels overlaid with reflection inhibiting films which are superior in reflection inhibiting effect and in mechanical strength and also have an antistatic function. Moreover, these display panels can be produced by a simple safety process without using any harmful chemical such as hydrofluoric acid, hence being best suited for mass production and also superior in antifouling property.

What is claimed is:

1. An image display panel having an antistatic [film] *coat* comprising a $SiO_2$ coat of transparent and electroconductive properties on the front surface of said panel; said coat containing fine particles *exhibiting or capable of absorbing moisture to impart electroconductivity, all of said fine particles exhibiting or capable of absorbing moisture to impart electroconductivity consisting essentially* of at least one compound selected from electroconductive metal oxides and hygroscopic metal salts capable of absorbing moisture to impart electroconductivity to said coat.

2. The image display panel of claim 1, wherein the antistatic coat itself either has the non-glare function or is overlaid with a non-glare coat.

3. The image display panel of claim 2, wherein the non-glare coat overlaid on said antistatic coat comprises a thin $SiO_2$ film which contains fine $SiO_2$ particles of 100–10,000 Å in diameter; said particles being coated by said film so as to fix on the surface of said panel.

4. The image display panel of claim 3, wherein the thickness of said antistatic coat is up to 2000 Å and the amount of fine $SiO_2$ particles contained in the non-glare coat is in a range of 0.01–1 mg/cm$^2$.

5. The image display panel of claim 4, wherein the thickness of the antistatic coat is 50–500 Å and the amount of said fine $SiO_2$ particles is in a range of 0.1–0.3 mg/cm$^2$.

6. The image display panel of claim 1, wherein said at least one compound is one selected from the group consisting of tin oxide, indium oxide, antimony oxide, chlorides, nitrates, sulfates, and carboxylates of metals of groups II and III of the periodic table.

7. The image display panel of claim 1, wherein the content of said at least one compound in said $SiO_2$ film is in a range of 0.01–1.0 mg/cm$^2$ area of the film.

8. The image display panel of claim 1, wherein the antistatic coat is formed as a thin $SiO_2$ film having also reflection inhibitory function and containing further fine $SiO_2$ particles of 100–10,000 Å in diameter in addition to said at least one compound.

9. The image display panel of claim 8, wherein said at least one compound is one selected from the group consisting of salts of metals of the groups II and III of the periodic table, tin oxide, indium oxide and antimony oxide.

10. The image display panel of claim 8, wherein said $SiO_2$ film contains 0.01 to 1.0 mg/cm$^2$ of said fine $SiO_2$ particles and 0.01 to 1.0 mg/cm$^2$ of said compound, respectively.

11. The image display panel of claim 10, wherein the amount of said fine $SiO_2$ particles contained is 0.1–0.3 mg/cm$^2$ and the amount of said at least one compound of fine particles contained is 0.15–0.3 mg/cm$^2$.

12. The image display panel of claim 2, wherein the antistatic coat has itself a non-glare function, and said antistatic coat has fine projections on its surface and contains fine particles of at least one metal oxide selected from $SnO_2$, $In_2O_3$ and $Sb_2O_3$.

13. The image display panel of claim 1, wherein said antistatic coat contains fine particles of at least one electroconductive metal oxide selected from $SnO_2$, $In_2O_3$, and $Sb_2O_3$ and said $SiO_2$ coat is formed by applying an alcoholic solution of alkoxysilane [$Si(OR_1)_4$, wherein $R_1$ is alkyl] on the front surface of panel, followed by heat treatment of the resulting coat at temperatures of up to 200° C.

14. The image display panel of claim 1, wherein said at least one compound is selected from the group consisting of tin oxide, indium oxide and antimony oxide.

15. The image display panel of claim 1, wherein said at least one compound is selected from the group consisting of chlorides, nitrates, sulfates and carboxylates of metals of groups II and III of the Periodic Table.

16. A process for producing image display panels which comprises applying a suspension of fine particles of at least one of electroconductive metal oxides and hygroscopic metal salts in an alcoholic solution of alkoxysilane on the front surface of panel, followed by heat treatment of the resulting coat to form an antistatic film comprising a transparent electroconductive $SiO_2$ coat on the front surface.

17. The process of claim 16 which comprises forming further a non-glare film on the antistatic film.

18. The process of claim 17, wherein the formation of a non-glare film comprises the steps of; dispersing fine $SiO_2$ particles of 100–10,000 Å in diameter in an alcoholic solution of alkoxysilane $Si(OR_1)_4$, wherein $R_1$ is alkyl, applying the suspension on the antistatic film which is the transparent substrate formed on the panel; and heating the resulting coat to decompose the $Si(OR_1)_4$, forming a thin $SiO_2$ film, therewith covering and fixing the fine $SiO_2$ particles.

19. The process of claim 18 wherein the hygroscopic metal salts are chlorides, nitrates, sulfates, and carboxylates of metals of groups II and III of the period table and the transparent conductive metal oxides are of tin, indium, and antimony.

20. The process of claim 16, wherein said suspension is prepared by dissolving or dispersing 0.05–7% by weight of the metal oxide or metal salt in the alcoholic solution of alkoxysilane.

21. The process of claim 16, wherein the first step comprises applying the suspension prepared by further adding a ketone or ethyl Cellosolve as a dispersing medium for the metal salt and metal oxide to the alcoholic solution and also adding water and, as a catalyst, an inorganic acid for facilitating the hydrolysis of $Si(OR_1)_4$.

22. The process of claim 18, wherein said suspension is prepared by dispersing 0.1–10% by weight of the fine $SiO_2$ particles in the alcoholic solution of $Si(OR_1)_4$.

23. The process of claim 18 or 22, wherein $R_1$ of the alcoholic solution is ethyl alcohol.

24. The process of claim 22, wherein said suspension is prepared by further adding a ketone or ethyl Cellosolve as a dispersing medium for the fine $SiO_2$ particles and also adding water and an inorganic acid for facilitating the hydrolysis of $Si(OR_1)_4$.

25. The process of claim 16, which said suspension is applied by spin coating, dip coating, spray coating, or combination of these coating methods and the heat treatment of coating surface is conducted at 50°–200° C.

26. The process of claim 16, wherein said antistatic film is formed by the steps which comprises dispersing fine $SiO_2$ particles of 100–10,000 Å in diameter in an alcoholic solution of $Si(OR_1)_4$ wherein $R_1$ is alkyl; and also dispersing particles of at least one compound selected from hygroscopic metal salts and electroconductive metal oxides, applying the resulting suspension on the antistatic film, heating the resulting coat to decompose the $Si(OR_1)_4$ and forming a thin $SiO_2$ film to coat fine $SiO_2$ particles in order to fix them on the surface of said panel, whereby said antistatic film also has a non-glare function.

27. The process of claim 27, wherein said at least one compound is one selected from the group consisting of chlorides, nitrates, sulfates, carboxylates of metals of groups II and III of the periodic table and the oxides of tin, indium, and antimony.

28. The process of claim 27 the said fine $SiO_2$ particles in the alcoholic solution of $Si(OR_1)_4$ is contained from 0.1 to 10% by weight and said at least one compound in that solution is from 0.05 to 7% by weight.

29. The process of claim 28, wherein said fine $SiO_2$ particles is contained in a range of from 1 to 3% by weight and said at least one compound from 1.0 to 2.0% by weight.

30. The process of claim 26, wherein $R_1$ of the $Si(OR_1)_4$ is ethyl and the alcohol component of the alcoholic solution consists mainly of ethyl alcohol.

31. The process of claim 30, wherein said suspension is prepared by further adding a ketone as a dispersing medium for the fine $SiO_2$ particles to the alcoholic solution, water and an inorganic acid, as a catalyst, for facilitating the hydrolysis of $Si(OR_1)_4$.

32. The process of claim 26, wherein said suspension is applied by spin coating, dip coating, spray coating, or combination of these coating methods and the heat treatment of coating surface if conducted at 50°–200° C.

33. The process of claim 17, wherein said antistatic film is formed on the front surface of an image display panel by applying an alcoholic $Si(OR_1)_4$ solution, wherein $R_1$ is alkyl, containing at least one of $SnO_2$, $In_2O_3$, and $Sb_2O_3$ on the front surface, and burning the coat preliminarily, and further said nonglare film is formed on the preliminarily burnt coat by applying an alcoholic solution of $Si(OR_1)_4$ by spray coating, and burning the whole coat fully, thereby forming film projections of $SiO_2$ at the outermost surface.

34. The process of claim 16, wherein the suspension is a dispersion of fine particles of at least one of $SnO_2$, $In_2O_3$, and $Sb_2O_3$ in an alcoholic solution of alkoxysilane $Si(OR_1)$ $_4$, wherein $R_1$ is alkyl, and the heat treatment is carried out at temperatures of up to 200° C.

35. The process of claim 6, wherein said suspension includes an electroconductive metal oxide selected from the group consisting of tin oxide, indium oxide and antimony oxide.

36. The process of claim 16, wherein said suspension includes a hygroscopic metal salt selected from the group consisting of chlorides, nitrates, sulfates and carboxylates of metals of groups II and III of the Periodic Table.

*37. The image display panel of claim 1, wherein said fine particles exhibiting or capable of absorbing moisture to impart electroconductivity consist essentially of electroconductive metal oxides.*

*38. The image display panel of claim 37, wherein the antistatic coat itself either has the non-glare function or is overlaid with a non-glare coat.*

*39. The image display panel of claim 37, wherein the antistatic coat is overlaid with a non-glare coat.*

*40. The image display panel of any of claims 37 to 39, wherein the content of said at least one compound in said $SiO_2$ film is in the range of 0.1–1.0 mg/cm$^2$ area of the film.*

*41. The image display panel of any of claims 37 to 39, wherein the content of said at least one compound in said $SiO_2$ film is in the range of 0.15–0.3 mg/cm$^2$ area of the film.*

*42. The image display panel of any of claims 37 to 39, wherein said antistatic coat has itself a non-glare function, and said antistatic coat has fine projections on its surface and contains fine particles of at least one metal oxide selected from $SnO_2$, $In_2O_3$ and $Sb_2O_3$.*

*43. The image display panel of any one of claims 37 and 39, wherein said fine particles consist essentially of at least one metal oxide selected from $SnO_2$, $In_2O_3$ and $Sb_2O_3$.*

*44. The image display panel of claim 37, wherein said antistatic coat contains fine particles of at least one electroconductive metal oxide selected from $SnO_2$, $In_2O_3$ and $Sb_2O_3$ and said $SiO_2$ coat is formed by applying an alcoholic solution of alkoxysilane $(Si(OR_1))_4$, wherein $R_1$ is alkyl on the front surface of panel, followed by heat treatment of the resulting coat at temperatures of up to 200° C.*

*45. The image display panel of claim 39, wherein said fine particles consist essentially of at least one metal oxide selected from $SnO_2$, $In_2O_3$ and $Sb_2O_3$; and wherein said antistatic coat has a thickness up to 2000 Å.*

*46. The image display panel of claim 45, wherein said antistatic coat has a thickness of 50–500 Å.*

*47. The image display panel of claim 37, wherein said antistatic coat is overlaid with a $SiO_2$ film.*

*48. The image display panel of claim 47, wherein said $SiO_2$ film has fine projections.*

*49. The image display panel of claim 47, wherein said fine particles consist essentially of at least one metal oxide selected from $SnO_2$, $In_2O_3$ and $Sb_2O_3$; and wherein said antistatic coat has a thickness up to 2000 Å.*

*50. The image display panel of claim 47, wherein said antistatic coat has a thickness of 50–500 Å.*

*51. The image display panel of claim 48, wherein said fine particles consist essentially of at least one metal oxide selected from $SnO_2$, $In_2O_3$ and $Sb_2O_3$; and wherein said antistatic coat has a thickness up to 2000 Å.*

*52. The image display panel of claim 48, wherein said antistatic coat has a thickness of 50–500 Å.*

*53. An image display panel having an antistatic film comprising a $SiO_2$ coat of transparent and electroconductive properties on the front surface of said panel; said coat containing fine particles of at least one compound selected from electroconductive metal oxides and hygroscopic metal salts capable of absorbing moisture to impart electroconductivity to said coat, wherein said antistatic cost is produced by applying a suspension of fine particles of at least one of electroconductive metal oxides and hygroscopic metal salts in an alcoholic solution of alkoxysilane on the front surface of panel, followed by heat treatment of the resulting coat to form an antistatic film comprising a transparent electroconductive $SiO_2$ coat on the front surface.*

*54. The image display panel of claim 53, wherein the heat treatment of the resulting coat is conducted at 50°–200° C.*

*55. The image display panel of claim 53, wherein the heat treatment of the resulting coat is conducted at 160°–180° C.*

*56. The image display panel of claim 53, wherein the heat treatment of the resulting coat is conducted without reaching a temperature of 500° C.*

*57. An image display panel having an antistatic film comprising a $SiO_2$ coat of transparent and electroconductive properties on the front surface of said panel; said coat containing fine particles of at least one compound selected from electroconductive metal oxides and hygroscopic metal salts capable of absorbing moisture to impart electroconductivity to said coat, wherein said antistatic cost is produced by applying a suspension of fine particles of at least one of electroconductive metal oxides and hygroscopic metal salts in a solution of alkoxysilane on the front surface of panel, followed by heat treatment of the resulting coat without reaching a temperature of 500° C. to form an antistatic film comprising a transparent electroconductive $SiO_2$ coat on the front surface.*

*58. The image display panel of claim 57, wherein the heat treatment of the resulting coat is conducted at 50°–200° C.*

*59. The image display panel of claim 57, wherein the heat treatment of the resulting coat is conducted at 160°–180° C.*

*60. The image display panel of any of claims 1–15, wherein said image display is a cathode ray tube.*

*61. The image display panel of any of claims 37 to 39, wherein said image display is a cathode ray tube.*

*62. The image display panel of claim 40, wherein said image display is a cathode ray tube.*

*63. The image display panel of claim 41, wherein said image display is a cathode ray tube.*

*64. The image display panel of claim 42, wherein said image display is a cathode ray tube.*

*65. The image display panel of claim 43, wherein said image display is a cathode ray tube.*

*66. The image display panel of any of claims 44 to 59, wherein said image display is a cathode ray tube.*

* * * * *